US010136345B2

(12) United States Patent
Nitsan et al.

(10) Patent No.: US 10,136,345 B2
(45) Date of Patent: Nov. 20, 2018

(54) TESTING A MOBILE APPLICATION

(75) Inventors: Amichai Nitsan, Rehovot (IL); Iris Sasson, Tel Aviv (IL); Gal Tunik, San Francisco, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 13 days.

(21) Appl. No.: 14/374,785

(22) PCT Filed: Feb. 7, 2012

(86) PCT No.: PCT/US2012/024087
§ 371 (c)(1),
(2), (4) Date: Jul. 25, 2014

(87) PCT Pub. No.: WO2013/119205
PCT Pub. Date: Aug. 15, 2013

(65) Prior Publication Data
US 2014/0357250 A1    Dec. 4, 2014

(51) Int. Cl.
*H04M 3/00*    (2006.01)
*H04W 24/06*    (2009.01)
*H04W 4/60*    (2018.01)
*H04W 4/00*    (2018.01)
*H04W 4/02*    (2018.01)

(52) U.S. Cl.
CPC ........... *H04W 24/06* (2013.01); *H04W 4/003* (2013.01); *H04W 4/60* (2018.02); *H04W 4/02* (2013.01)

(58) Field of Classification Search
CPC .................................................. G06F 11/3457
USPC ....................................................... 455/418
See application file for complete search history.

(56) References Cited

U.S. PATENT DOCUMENTS

| 6,272,337 | B1 | 8/2001 | Mount et al. | |
| 7,813,910 | B1 | 10/2010 | Poulin | |
| 8,578,020 | B2* | 11/2013 | Van Den Bogaert | H04L 43/0876 709/224 |
| 2006/0009157 | A1* | 1/2006 | Chiu | H04W 16/22 455/67.11 |
| 2006/0072628 | A1* | 4/2006 | Liu | H04L 41/145 370/516 |
| 2006/0256720 | A1* | 11/2006 | Curran-Gray | H04L 41/145 370/235 |
| 2006/0282247 | A1* | 12/2006 | Brennan | H04W 24/00 703/13 |
| 2007/0117560 | A1 | 5/2007 | Pora et al. | |
| 2008/0139195 | A1 | 6/2008 | Marsyla et al. | |
| 2009/0207743 | A1* | 8/2009 | Huq | H04L 12/2697 370/250 |

(Continued)

OTHER PUBLICATIONS

Korean Intellectual Property Office, International Search Report and Written Opinion, dated Oct. 31, 2012, 9 pages, Daejeon Metropolitan City, Republic of Korea.

(Continued)

*Primary Examiner* — Thomas Lett

(57) ABSTRACT

Systems, methods, and computer-readable and executable instructions are provided for testing a mobile application. Testing a mobile application can include simulating a cellular network condition for each of a plurality of locations utilizing a network simulation engine. Furthermore, testing a mobile application can include testing performance of the mobile application for each of the simulated cellular network conditions.

18 Claims, 2 Drawing Sheets

(56) References Cited

U.S. PATENT DOCUMENTS

| | | |
|---|---|---|
| 2011/0028145 A1 | 2/2011 | Marsyla et al. |
| 2011/0145642 A1 | 6/2011 | Balaji et al. |
| 2011/0161484 A1* | 6/2011 | Van den Bogaert ......................... H04L 43/0876 709/224 |

OTHER PUBLICATIONS

Supplementary European Search Report, dated Sep. 24, 2015, European Patent Application No. 12867768.9, 7 pages.

* cited by examiner

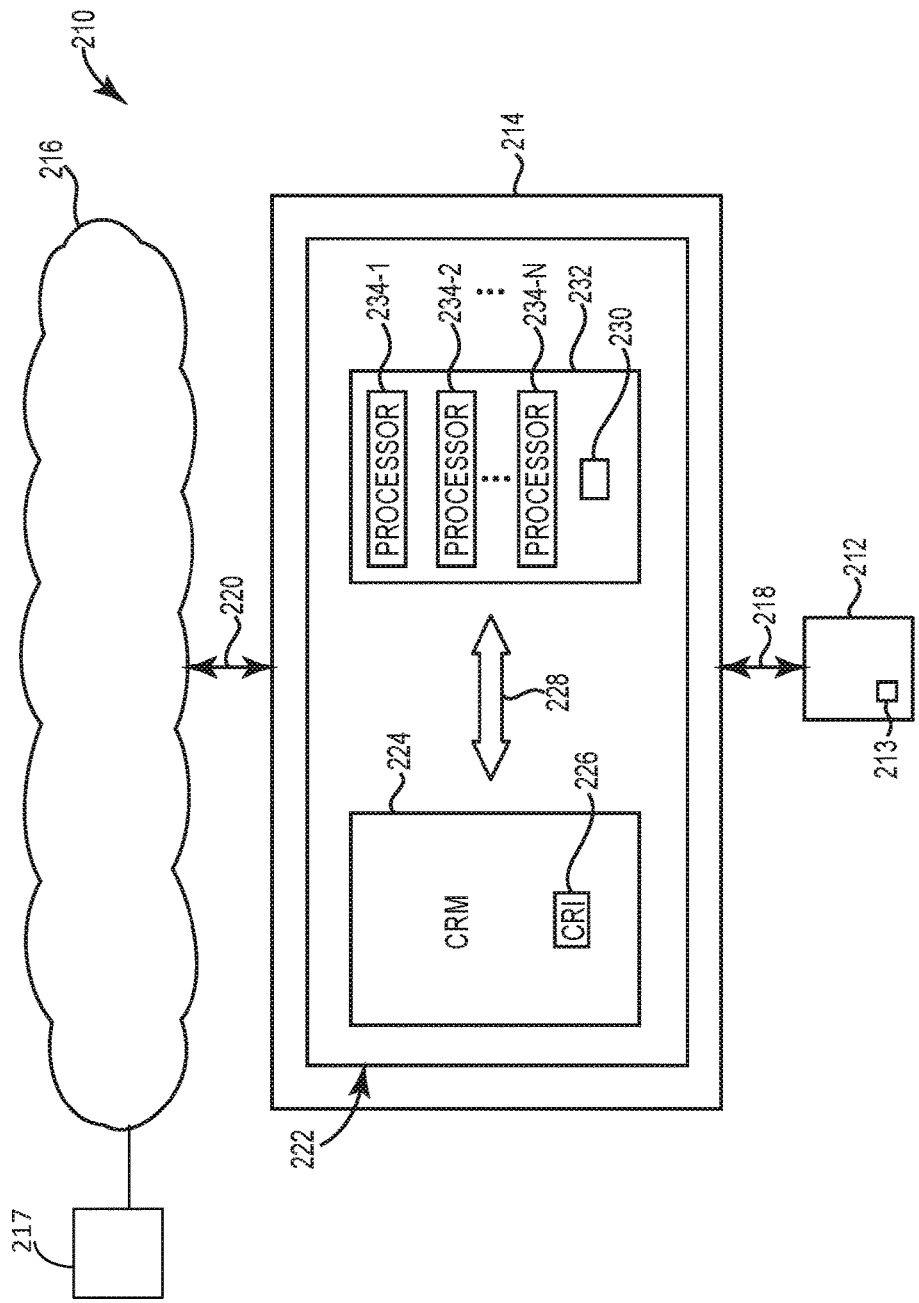

TESTING A MOBILE APPLICATION

BACKGROUND

Cellular networks can have changing conditions, including but not limited to sudden drops in quality and varying bandwidth. These changes in cellular network conditions can affect the performance of mobile applications operating on a mobile device in the cellular network.

BRIEF DESCRIPTION OF THE DRAWINGS

FIG. 2 illustrates a diagram of an example system for testing a mobile application according to the present disclosure.

DETAILED DESCRIPTION

Figure 1:
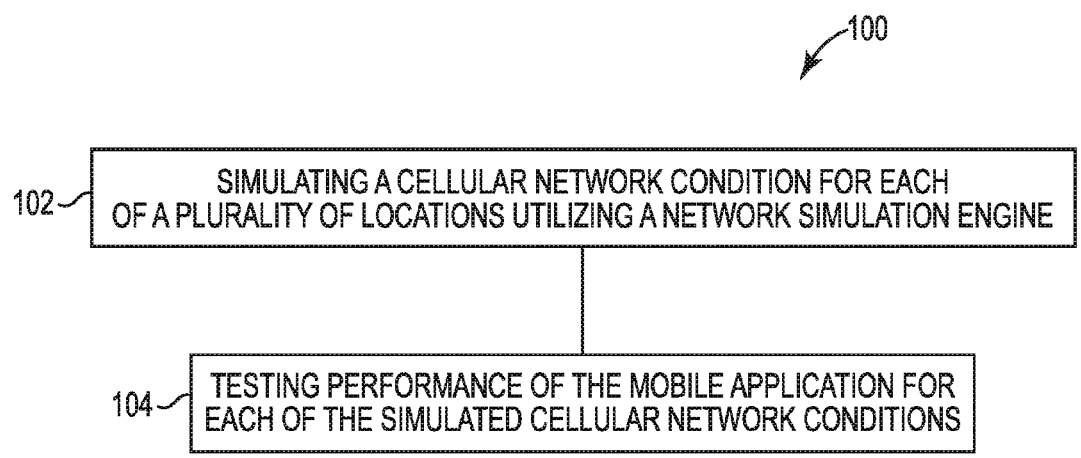
FIG. 1 illustrates a flow chart of an example method for testing a mobile application according to the present disclosure.

Examples of the present disclosure include methods, systems, and computer-readable and executable instructions for testing a mobile application. Methods for testing a mobile application can include simulating a cellular network condition for each of a plurality of locations utilizing a network simulation engine. Furthermore, testing a mobile application can include testing performance of the mobile application for each of the simulated cellular network conditions.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

Cellular networks provide services (e.g., mobile phone signal, 3G, 4G, WiFi®, among others) and can have variable performance (e.g., signal strength, network bandwidth, speed, etc.). The variable performance of a cellular network can affect the performance of mobile applications (e.g., mobile device firmware, mobile device software, among others) on mobile devices. By utilizing real mobile devices and simulating cellular network conditions of individual locations, the performance of mobile applications on mobile devices can be tested and collected while the mobile device is in a single location. This process can be more-cost-effective as compared to previous methods of testing the mobile device from various locations.

FIG. 1 illustrates a flow chart of an example method 100 for testing a mobile application according to the present disclosure. Testing a mobile application can include manual testing by a user and/or automatic testing using an automation engine.

A mobile application can be software, hardware, and/or firmware on a mobile device. A mobile device can include, a cell phone, a personal digital assistant, a tablet, as well as other mobile devices that can utilize a cellular network (e.g., 3G, 4G; WiFi®, among others). A mobile application can perform a function (e.g., a calculation, a communication with a different device, a game, among others) on the mobile device, and the function can be dependent upon the cellular network. For example, the mobile application may utilize the cellular network to retrieve information to present to the user of the mobile device.

The performance of the mobile application, which can include a number of criteria (e.g., speed, visual effects, functionality, among others), can be affected by variations in the quality of the cellular network. A variation in the quality of a cellular network can include a change in an expected signal quality and can result in the mobile application losing functionality. For example, if the function of the mobile application is to retrieve news stories, a sudden drop in cellular service may result in the mobile application being unable to retrieve a news story for the user.

At 102, a cellular network condition is simulated for each of a plurality of locations utilizing a network simulation engine. The cellular network condition can be the performance of the cellular network. For example, a particular location may have a particular bandwidth, speed, signal strength, and/or possibility of dropping service, among other performance conditions, at a given time. A simulated cellular network condition can comprise a variety of signals and/or connections (3G, 4G, broadband, digital subscriber line (DSL), Ethernet, WiFi®, among others). The network simulation engine can utilize a signal with properties that can be altered to simulate a desired cellular network condition. For example, DSL can be utilized by the network simulation engine to simulate a cellular network condition for a mobile device.

A particular location (e.g., geographical location) can have varying cellular network conditions from other locations. These varying cellular network conditions for different locations and times can be attributed to many factors unique to the location or time (e.g., distance from a cellular communications tower, interferences near the locations, number of users on the cellular network at a specific time, limitations of a cellular provider, among other factors). For example, a location can be relatively close or relatively far away from a cellular communications tower that transmits the cellular network signal. In a different example, an object or landmark can be between the mobile device and the communications tower causing an interference with the cellular network signal.

The network simulation engine can simulate various cellular network conditions. The mobile device can use the simulated cellular network conditions as if the cellular signal was produced directly from a cellular provider (e.g., AT&T®, T-Mobile®, Sprint®).For example, if a cell phone uses a cellular signal provided by AT&T®, then the cell phone could receive the simulated cellular network condition produced by the network simulation engine in the same or similar way that the cell phone receives the cellular signal provided by AT&T®.

The mobile device and/or mobile application utilization of the simulated cellular network conditions can be routed to a computing device. The computing device can comprise computer readable media, software, hardware, logic, and/or firmware that can simulate the cellular network condition that is sent to the mobile device and/or mobile application. The computing device can also receive communication from the mobile device. For example, the computing device can receive performance data from the mobile device.

Some or all of the communication between a cellular provider and a mobile device can be routed through the computing device. Routing can allow the computing device to alter the original signal from the cellular provider to produce the simulated cellular network condition before sending the simulated cellular network condition to the mobile device. The computing device can utilize the properties of the cellular provided network at the location of the computing device and make adjustments to the cellular provided network to produce a simulated cellular network condition of a different location. Routing can allow the computing device to utilize various features provided by the cellular provider without having to create a reproduction of the cellular signal. Furthermore, routing can produce greater accuracy in test results by utilizing real cellular network signals produced by real cellular network providers.

The network simulation engine can produce a simulated cellular network condition of a geographical location based on cellular network condition data collected from the specific location. Cellular network condition data for a specific location can be collected through experimentation in the field or through simulation. For example, cellular network condition data can be collected through information collected and sent to a database from a number of mobile devices reporting on the cellular network connectivity and location of the mobile device in a location. The cellular network condition can also be simulated based on a cellular probe. A cellular probe can be at a geographical location and collect real-time data of network conditions for the geographical location. The cellular probe can send the real-time data of the network condition to the network simulation engine. The network simulation engine can use the real-time data to provide the mobile device with a real-time simulation of the geographical location.

The cellular network condition data can be simulated based on various conditions and/or cellular network predictors (e.g., interferences, locations of towers, type of technology, number of users compared to number of towers, etc.). The collected cellular network data and/or the simulations can be conducted for any number of locations and/or for any part of the world. The simulated data can comprise increases in signal, decreases in signal, sudden drops in signal, among other simulated data scenarios. The simulated data can be performed periodically with no specific geographical area or simulated geographical area as a guide.

The network simulation engine can also produce a simulated cellular network condition for a non-real location based on cellular network predictors (e.g., geographical terrain, number of cellular communication towers, location of cellular communication towers, among other factors) or predictions of future cellular network conditions. The hypothetical data or predictions can be performed by comparing cellular network conditions of real locations with similar cellular network features. For example, by comparing a real location with similar geographical features and cellular technology implemented.

At 104, performance of the mobile application is tested for each of the simulated cellular network conditions. The simulated cellular conditions can be any number of cellular conditions for any number of locations. For example, the simulated cellular conditions can be the bandwidth and signal strength for a single or a plurality of real locations. The simulated cellular network conditions can be based on data collected from the single or plurality of real locations. The simulated cellular network conditions can also be simulated or calculated based on the cellular network predictors (e.g., landscape, number of cellular communication towers, a number of users in the location, among other properties).

Testing performance can include testing the various functions (e.g., retrieving information via cellular network, performing a calculation, displaying a picture and/or video, performing a task, among other functions) of the mobile application. For example, testing performance can include testing the rate at which a news application is able to retrieve and show a news story. Testing performance can also include testing the functionality of the mobile application. For example, a test can be run to test whether or not the mobile application completes a particular function. Testing can include multiple criteria tests of the mobile application for each of a number of simulated cellular network conditions. For example, the test can include three criteria of the mobile application to be tested for each simulated cellular network condition. Testing multiple criteria of a single mobile application on each of the number of simulated cellular network conditions can give an increased understanding of the overall performance of the mobile application at the location of the simulated cellular network condition as compared to testing a single criterion.

Results of the testing can be compiled to create a mobile application performance report. The mobile application performance report can include performance criteria (e.g., latency, image quality, sound quality, among others) of the various functions. The mobile application performance report can be used to determine an overall mobile application performance. An overall mobile application performance can include combining test results for various performance criteria from the performance report to further evaluate the mobile application for a particular cellular network condition. For example, a mobile application performance report can include test results for performance criteria of a cell phone application using a single cellular network condition. In this example, the performance report can be used to determine the performance of the mobile application at the location represented by the single cellular network condition used.

Testing can include using an automation engine to automatically perform various tests on the mobile application. The automation engine can perform the functions of the mobile application. For example, the automation engine can be programmed to make a Hypertext Transfer Protocol (HTTP) request on the mobile application. The automation engine can perform the function on the mobile device at a specific time. For example, the automation engine can start performing the function on the mobile device at a time that allows a user to collect data from the mobile application.

The automation engine can be synchronized with the network simulation engine. Synchronization of the automation engine and the network simulation engine can include utilizing the automation engine to perform a function on the mobile device at the same time that the network simulation engine is simulating a particular simulated network condition.

Synchronization of the automation engine and the network simulation engine can also include the automation engine performing a function of the mobile application on a particular simulated network condition produced by the network simulation engine. The synchronization can also include a completion of the function of the mobile application, and the network simulation engine can change the simulated network condition to a different network condition. The synchronization can further include the automation engine performing a function of the mobile application on the different network condition produced by the network simulation engine. The synchronization can continue for a number of iterations.

Synchronization of the automation engine and the network simulation engine can allow changes to cellular network conditions during the test run (e.g., continuous testing). For example, the synchronization of the automation engine and network simulation engine can automatically perform a number of performance tests on a mobile application for each of a plurality of different simulated cellular network conditions during the same test run.

Testing can also include manually testing the application. Manually testing the application can include having a user (e.g., customer, technician, among others) operate the application functions and report the application performance.

The method 100 can result in a reduced cost as compared to the cost of testing a mobile application in a number of different locations. The method 100 can allow multiple tests on a mobile application running on a real mobile device for multiple locations around the world while the mobile device is in a single location. Furthermore, the method 100 can allow a mobile device to experience the cellular network of various locations without physically entering the various locations.

FIG. 2 illustrates a diagram of an example system 210 for testing a mobile application according to the present disclosure. System 210 includes a mobile device 212 communicatively connected to a network simulation engine 214 and the network simulation engine 214 communicatively connected to a cellular network 216.

A cellular network 216 communicatively connected via a cellular signal 220 to a network simulation engine 214. The cellular network can be provided by the cellular network provider 217 (AT&T®, T-Mobile®, Sprint®, Century Link®, Comcast®, etc.). The cellular signal 220 can be a number of different cellular signal types (e.g., 3G, 4G, WiFi®, DSL, cable, etc.).

The network simulation engine 214 can provide a cellular network simulation condition to a mobile device 212 via a cellular signal 218 (e.g., mobile phone signal, 3G, 4G, broadband, DSL, cable, etc). As described herein, the network simulation engine 214 can utilize software, hardware, firmware, and/or logic to provide a simulated cellular network condition to the mobile device 212. The network simulation engine 212 can be any combination of hardware and program instructions configured to simulate a cellular network condition. The hardware, for example can include one or more processing resources 234-1, 234-2, . . . , 234-N, computer readable medium (CRM) 224, etc. The program instructions can include instructions stored on the CRM 224 and executable by the processor to implement a desired function (e.g., simulate a network condition for a particular location).

The network simulation engine 214 can be disconnected from the cellular network 216. The network simulation engine 214 can create a simulation and transmit the simulated cellular signal 218 to the mobile device without being connected to the cellular network 216. The simulated cellular signal 218 can be utilized by the mobile device 212 when performing a request of the simulated cellular signal 218 (e.g., Hypertext Transfer Protocol HTTP request, among other requests).

The network simulation engine 214 can also include an automation engine. As described herein, the automation engine can perform various tests on the mobile application of the mobile device 212. The automation engine can be any combination of hardware and program instructions configured to automatically perform various tests on the mobile application. The hardware, for example can include one or more processing resources 234-1, 234-2, . . . , 234-N, CRM 224, etc. The program instructions can include instructions stored on the CRM 224 and executable by the processor to implement a desired function (e.g., perform a function on the mobile application automatically, perform a function on the mobile application at a desired time, perform a HTTP request, among other functions).

The network simulation engine 214 can receive some or all communication between the mobile device 212 and the cellular network 216. Routing the communication to the network simulation engine 214 can allow a mobile device 212 to send communication to the network simulation engine 214 via cellular signal 218 instead of directly communicating with the cellular network 216. Routing can also allow the network simulation engine 214 to utilize the cellular signal 220 from the cellular network 216.

Routing can be performed in a variety of ways utilizing software, firmware, hardware, and/or logic. Routing the cellular signal 218 can by performed by a routing program 213 (e.g., software, firmware, logic, etc.) on the mobile device. The routing program 213 can re-direct the intended communication with the cellular network 216 to the network simulation engine 214. For example, the routing program 213 can intercept the instructions of the mobile device 212 that are normally used to connect to the cellular network 216 and instead connect to the network simulation engine 214.

The routing program 213 can also have a setting within a mobile application and/or operating system (OS) that can allow a user to change a connection setting (e.g., proxy setting, among others). Changing the connection setting to the network simulation engine 214 can allow the mobile device 212 to connect to the network simulation engine 214.

Routing can also be accomplished utilizing a network switch or cellular access point. The mobile device 212 can utilize the network switch or cellular access point connect to the network simulation engine 214.

The mobile device 212 can be a number of computing devices (e.g., cell phone, tablet, smartphone, personal digital assistant, mobile device simulator, among other computing devices) that can utilize a cellular network 216. The mobile device 212 can also be a mobile device simulator. A mobile device simulator can simulate functions of a real mobile device. A mobile device simulator can be used to simulate a particular mobile device operating a particular mobile application utilizing the simulated cellular network condition.

The network simulation engine 214 can also include a CRM 224 in communication with processing resources 234-1, 234-2, . . . , 234-N. Block diagram 222 is represented within the network simulation engine 214. Block diagram 222 can also be implemented outside of the network simulation engine 214, either communicatively coupled to the network simulation engine 214 and/or performed by a different computing device.

CRM 224 can be in communication with a computing device 232 (e.g., a Java® application server, among others) having processor resources of more or fewer than 234-1, 234-2, . . . , 234-N. The computing device 232 can be in communication with a tangible non-transitory CRM 224 storing a set of computer-readable instructions (CRI) 226 executable by one or more of the processor resources 234-1, 234-2, . . . , 234-N, as described herein. The CRI 226 can also be stored in remote memory managed by a server and represent an installation package that can be downloaded, installed, and executed. The computing device 232 can include memory resources 230, and the processor resources 234-1, 234-2, . . . , 234-N can be coupled to the memory resources 230.

Processor resources 234-1, 234-2, , . . . , 234-N can execute CRI 226 that can be stored on an internal or external non-transitory CRM 224. The processor resources 234-1, 234-2, . . . , 234-N can execute CRI 226 to perform various functions, including the functions described in FIG. 1. For example, the processor resources 234-1, 234-2, . . . , 234-N can execute CRI 226 to implement the network simulation engine 214. A non-transitory CRM (e.g., CRM 224), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 224 can be integral, or communicatively coupled, to a computing device, in a wired and/or a wireless manner. For example, the non-transitory CRM 224 can be an internal memory, a portable memory, a portable disk, or a memory associated with another computing resource (e.g., enabling CRIs to be transferred and/or executed across a network such as the Internet).

The CRM 224 can be in communication with the processor resources 234-1, 234-2, . . . , 234-N via a communication path 228. The communication path 228 can be local or remote to a machine (e.g., a computer) associated with the processor resources 234-1, 234-2, . . . , 234-N. Examples of a local communication path 228 can include an electronic bus internal to a machine (e.g., a computer) where the CRM 224 is one of volatile, non-volatile, fixed, and/or removable storage medium in communication with the processor resources 234-1, 234-2, . . . , 234-N via the electronic bus, Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 228 can be such that the CRM 224 is remote from the processor resources e.g., 234-1, 234-2, . . . , 234-N, such as in a network connection between the CRM 224 and the processor resources (e.g., 234-1, 234-2, . . . , 234-N). That is, the communication path 228 can be a network connection, Examples of such a network connection can include a local area network (LAN), wide area network (WAN), personal area network (PAN), and the Internet, among others. In such examples, the CRM 224 can be associated with a first computing device and the processor resources 234-1, 234-2, . . . , 234-N can be associated with a second computing device (e.g., a Java® server, network simulation engine 214). For example, a processing resource 234-1, 234-2, 234-N can be in communication with a CRM 224, wherein the CRM 224 includes a set of instructions and wherein the processing resource 234-1, 234-2, . . . , 234-N is designed to carry out the set of instructions to test a mobile application.

The processor resources 234-1, 234-2, . . . , 234-N coupled to the memory 226 can enable network simulation engine 214 to simulate a cellular network condition of a first location. The processor resources 234-1, 234-2, . . . , 234-N coupled to the memory 226 can also send the simulated cellular network condition to a real mobile device at a second location. The processor resources 234-1, 234-2, . . . , 234-N coupled to the memory 226 can also determine performance of a mobile application operating on the real mobile device, wherein the real mobile device is operating on the simulated cellular network condition of the first location. The processor resources 234-1, 234-2, . . . , 234-N coupled to the memory 226 can also synchronize execution of the simulation and execution of the test. Furthermore, the processor resources 234-1, 234-2, . . . , 234-N coupled to the memory 226 can change to a different cellular network condition during the simulation based on the synchronization.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for testing a mobile application, comprising:
routing communication between a cellular provider and a real mobile device to a network simulation engine of a computing device;
simulating a cellular network condition for each of a plurality of locations utilizing the network simulation engine and the routed communication;
sending the simulated cellular network conditions to the real mobile device; and
testing performance of the mobile application on the real mobile device for each of the simulated cellular network conditions.

2. The method of claim 1, wherein simulating the cellular network conditions for the plurality of locations is performed while the real mobile device is at a single location.

3. The method of claim 1, wherein routing the communication includes altering a cellular signal from the cellular provider to the real mobile device during the simulating.

4. The method of claim 1, wherein simulating the cellular network conditions comprises utilizing collected cellular network data for a plurality of geographical locations during the simulating.

5. The method of claim 1, further comprising synchronizing execution of the testing and execution of the simulating.

6. The method of claim 1, wherein testing performance of the mobile application includes utilizing an automation engine that sends a request to the mobile application for the testing.

7. The method of claim 1, wherein each respective simulated cellular network condition of the simulated cellular network conditions is sent as if the respective simulated cellular network condition was produced directly from the cellular provider.

8. The method of claim 1 further comprising testing the performance of a firmware on the real mobile device.

9. The method of claim 1, wherein the cellular network condition is simulated for a location different than a location of the real mobile device.

10. The method of claim 1, wherein simulating the cellular network condition includes, for a respective location among the plurality of locations:

receiving, from a cellular probe, data of network conditions associated with the respective location; and simulating the cellular network condition using the data.

11. A non-transitory computer-readable medium storing a set of instructions executable by a processor to cause a computer to:

route communication between a cellular provider and a stationary real mobile device to the computer, wherein the stationary real mobile device is located in a single location;

simulate a cellular network condition for each of a plurality of simulated locations, using the routed communication;

send the simulated cellular network conditions for the plurality of simulated locations to the stationary real mobile device;

receive a mobile application performance report from the stationary real mobile device; and determine a mobile application performance for the stationary real mobile device for each of the simulated cellular network conditions based on the performance report.

12. The non-transitory computer-readable medium of claim 11, wherein the instructions are further executable to determine a mobile application functionality for each of the simulated cellular network conditions.

13. The non-transitory computer-readable medium of claim 11, wherein the simulated cellular network conditions include at least one of signal strength and bandwidth for a simulated geographical location.

14. The non-transitory computer-readable medium of claim 11, wherein the instructions to simulate the cellular network condition for each of the plurality of simulated locations includes instructions executable by the processor to:

generate the simulated network condition for a simulated location among the plurality of simulated locations by adjusting properties of a cellular network condition at a location of the computer.

15. A system for testing a mobile application, the system comprising a processor in communication with a non-transitory computer readable medium, wherein the non-transitory computer readable medium includes instructions executable by the processor to:

route communication between a cellular provider and a real mobile device to the processor;

simulate a cellular network condition of a first location, using the routed communication;

send the simulated cellular network condition to a real mobile device at a second location; and determine performance of a mobile application operating on the real mobile device at the second location, wherein the real mobile device is operating on the simulated cellular network condition of the first location.

16. The system of claim 15, wherein the first location has a different cellular network condition than the second location.

17. The system of claim 15, further including the processor to execute instructions to test performance of the mobile application utilizing an automation engine that sends a request to the mobile application as part of testing that determines the performance of the mobile application.

18. The system of claim 15, further including the processor to execute instructions to:

synchronize execution of the simulating and the determining of the performance; and change to a different cellular network condition during the simulating based on the synchronizing.

* * * * *